US00RE35201E

United States Patent [19]

Krauska

[11] E Patent Number: Re. 35,201

[45] Reissued Date of Patent: Apr. 9, 1996

[54] ADJUSTABLE BED WITH SINGLE ACTUATOR

[76] Inventor: Bernard J. Krauska, 2108 N. Pinewood Dr., Stevens Point, Wis. 54481

[21] Appl. No.: 276,710

[22] Filed: Jul. 18, 1994

Related U.S. Patent Documents

Reissue of:

[64] Patent No.: 5,245,718
Issued: Sep. 21, 1993
Appl. No.: 959,142
Filed: Oct. 9, 1992

[51] Int. Cl.[6] ..... A61G 7/00

[52] U.S. Cl. ..... 5/618; 5/613; 5/617

[58] Field of Search ..... 5/610, 611, 613, 5/617, 618

[56] References Cited

U.S. PATENT DOCUMENTS

| | | | |
|---|---|---|---|
| D. 271,729 | 12/1983 | Dodrill . | |
| 1,373,151 | 3/1921 | Slabinski . | |
| 2,543,451 | 2/1951 | Fenander . | |
| 2,779,951 | 2/1957 | Travis | 5/618 |
| 3,036,314 | 5/1962 | Wetzler . | |
| 3,059,248 | 10/1962 | Wetzler | 5/611 |
| 3,132,351 | 5/1964 | Huntress et al. . | |
| 3,217,339 | 11/1965 | Black | 5/611 |
| 3,863,278 | 2/1975 | Herrera . | |
| 3,877,088 | 4/1975 | Bouman . | |
| 3,974,530 | 8/1976 | Lusch et al. . | |
| 3,997,926 | 12/1976 | England | 5/610 |
| 4,258,445 | 3/1981 | Zur . | |
| 4,376,316 | 3/1983 | Mercier et al. . | |
| 4,385,410 | 5/1983 | Elliott | 5/618 |
| 4,425,673 | 1/1984 | Werner | 5/611 |
| 4,472,845 | 9/1984 | Chivetta et al. . | |
| 4,472,846 | 9/1984 | Volk, Jr. et al. . | |
| 4,675,926 | 6/1987 | Lindblom et al. . | |
| 4,839,932 | 6/1989 | Williamson . | |
| 4,862,529 | 9/1989 | Peck . | |
| 4,934,007 | 6/1990 | Sweet . | |
| 4,953,243 | 9/1990 | Birkmann . | |
| 4,953,244 | 9/1990 | Koerber, Sr. et al. . | |
| 4,970,737 | 11/1990 | Sagel . | |
| 4,987,622 | 6/1991 | Shockey | 5/610 |
| 4,993,089 | 2/1991 | Solomon et al. . | |
| 4,996,731 | 3/1991 | Kruyt . | |
| 5,063,623 | 11/1991 | Bathrick et al. . | |
| 5,105,486 | 4/1992 | Peterson . | |

FOREIGN PATENT DOCUMENTS

| | | | |
|---|---|---|---|
| 214695 | 3/1987 | European Pat. Off. | 5/618 |
| 2311608 | 3/1973 | Germany | 5/618 |
| 3516325 | 11/1986 | Germany | 5/611 |

*Primary Examiner*—Flemming Saether
*Attorney, Agent, or Firm*—Price, Heneveld, Cooper, DeWitt & Litton

[57] ABSTRACT

An adjustable bed includes a base frame and a mattress frame having a plurality of pivotally interconnected sections. A plurality of links are positioned between the base frame and the mattress frame. The mattress frame may be moved between a high position and a low position. A single linear actuator is connected to the mattress frame. The actuator is extendable and retractable to raise and lower the mattress frame with the mattress frame sections in a common plane. The actuator may also be retracted when the mattress frame is in the low position to articulate the mattress frame sections.

25 Claims, 4 Drawing Sheets

ADJUSTABLE BED WITH SINGLE ACTUATOR

Matter enclosed in heavy brackets [ ] appears in the original patent but forms no part of this reissue specification; matter printed in italics indicates the additions made by reissue.

BACKGROUND OF THE INVENTION

The present invention relates to beds and, more particularly, to adjustable, multiple position care beds.

Adjustable or articulating beds are commonly used in the healthcare field. A typical bed includes a base and a mattress frame or support which is divided into a head or back section, a seat section and a leg or foot section. The mattress frame sections are pivotally interconnected and have a continuous range of adjustment. The sections are moveable from a flat, patient resting position to a seated position with the legs bent or the legs straight and the patient's back angled upwardly with respect to the seat section. The sections are pivoted by motor drives, hand operated cranks or through the patient's weight.

An example of a multi-position adjustable bed may be found in commonly owned U.S. Pat. No. 5,105,486 entitled ADJUSTABLE BED, which issued on Apr. 21, 1992 to Peterson. The bed disclosed therein includes a mattress frame having a head section, a seat or intermediate section and a foot section, which are pivotally interconnected. A first link and positioner subassembly interconnects the head section with the seat section and a second link and positioner subassembly interconnects the seat section with the foot section. Each link and positioner subassembly includes an elongated rod and a lock mechanism. The lock mechanism selectively positions the rod with respect to a lock housing and, hence, the mattress sections with respect to each other. In addition, a high/low mechanism is provided for raising the mattress frame from a low position to a high position for easier patient care. The mattress frames may be articulated with respect to each other when the frame is in the high and/or low positions.

Examples or other adjustable beds may be found in U.S. Pat. No. 3,036,314 entitled ADJUSTABLE BED, which issued on May 29, 1962 to Wetzler; U.S. Pat. No. 3,059,248 entitled ADJUSTABLE BED, which issued on Oct. 23, 1962 to Wetzler; U.S. Pat. No. 4,258,445 entitled BEDS AND ADJUSTABLE BODY SUPPORTING ASSEMBLIES, which issued on Mar. 31, 1981 to Zur and U.S. Pat. No. 4,472,846 entitled COUPLING SYSTEM FOR THE MOTOR DRIVE IN AN ADJUSTABLE MOTORIZED HOSPITAL BED, which issued on Sep. 25, 1984 to Volk, Jr. et al. The Wetzler patents disclose adjustable beds including high/low mechanisms and a single drive motor. In Volk, Jr. et al., an adjustable bed is disclosed wherein different adjustment functions including high/low, back and knee adjustments are made by a single, reversible motor which is selectively coupled to a plurality of output drive shafts by a multiple clutch arrangement.

In the vast majority of instances, the full range of adjustment available with beds heretofore provided is not used. The most common mode of operation is to raise the mattress surface or sleeping surface in a flat configuration to a high position when patient care is being given. Raising the sleeping surface reduces back strain while changing dressings, bandages, clothes and performing other like operations. When a patient is left unattended, the bed is typically placed in its lowest position in an attempt to reduce possible injury in the event the patient tries to leave the bed or falls out of the bed. When articulating the mattress sections, typically the back or head section is the most frequently used mode. The back section is raised while the bed is in the low position. Back section elevation is used to increase the comfort of the patient while eating, reading, conversing, watching television and the like. In addition, a patient will typically use the back section as an arm support while exiting the bed. As a result, exiting of the bed should be done while the bed is in the low position. The standard operating requirements or most typical operational modes of an articulating bed are, therefore, a) elevated in a flat position and b) back articulation in a low position.

A need exists for an adjustable or articulated bed of reduced complexity from that heretofore provided, which meets the most common operating modes or requirements and which may be manufactured at a reduced cost with increased reliability.

SUMMARY OF THE INVENTION

In accordance with the present invention, the aforementioned needs are fulfilled. Essentially, an adjustable bed is provided including a mattress frame having a head or back section and a lower section pivoted thereto. Provision is made for attaching the mattress frame to a base frame so that it may be moved between low and high positions. A single actuator is operatively connected to a base frame and the head or back section of the mattress frame. The single actuator moves the mattress frame to an elevated or high position in a flat mode with the sections in a common plane. The single actuator articulates the back section with respect to the lower section only when the mattress surface or frame is in its low position.

In narrower aspects of the invention, a leg section pivot link is included to position a leg section of the mattress frame with respect to a seat section. As a result, different leg articulation positions may be obtained.

The adjustable bed and actuator in accordance with the present invention meets the most common operating requirements of the typical articulating bed. Only a single actuator is needed to achieve high and low positioning of the mattress frame with respect to the base frame and also to articulate the mattress frame sections.

DETAILED DESCRIPTION OF THE PREFERRED EMBODIMENT

Figure 1:
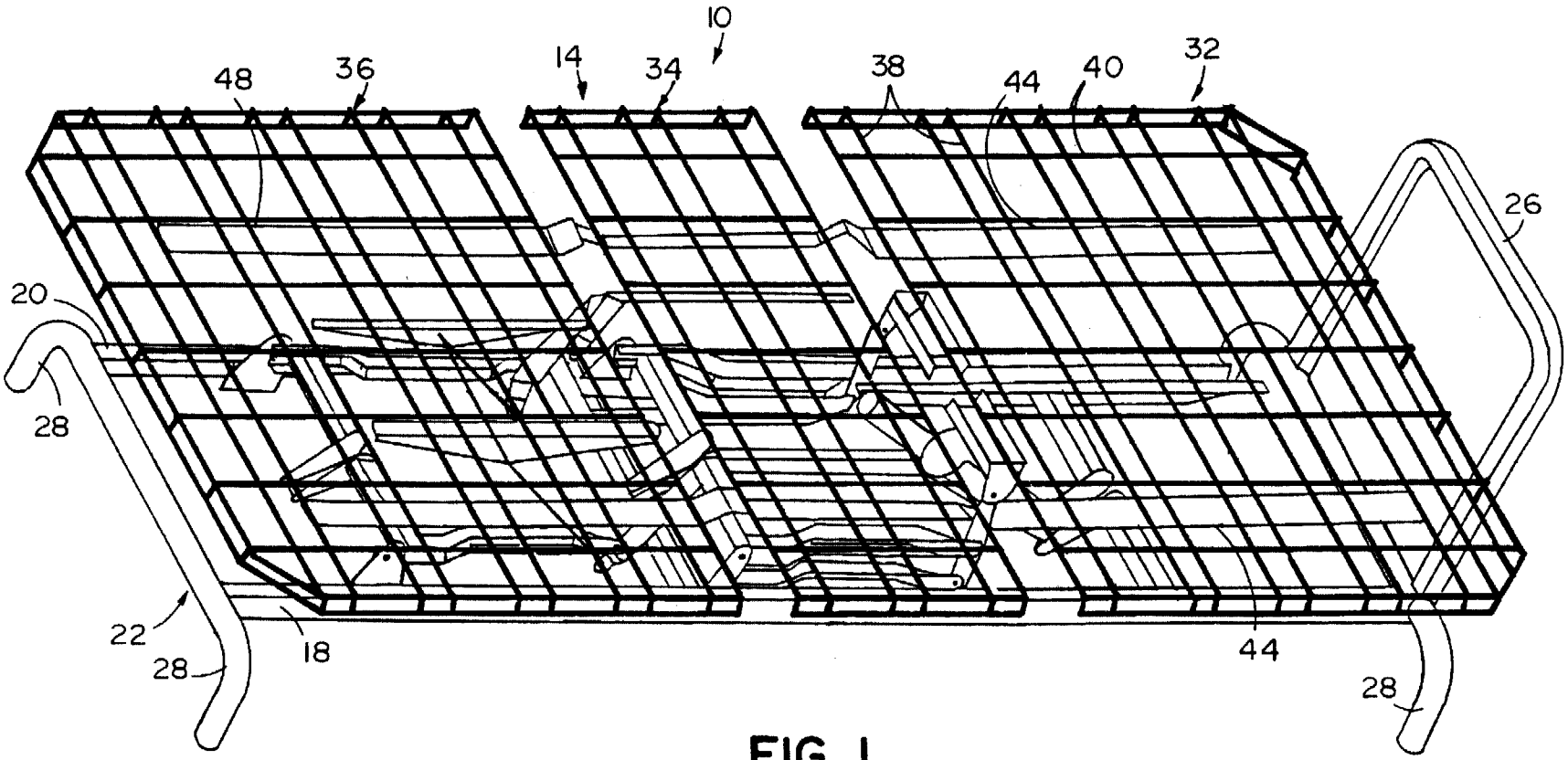
FIG. 1 is a perspective view of an adjustable bed in accordance with the present invention.
Figure 2:
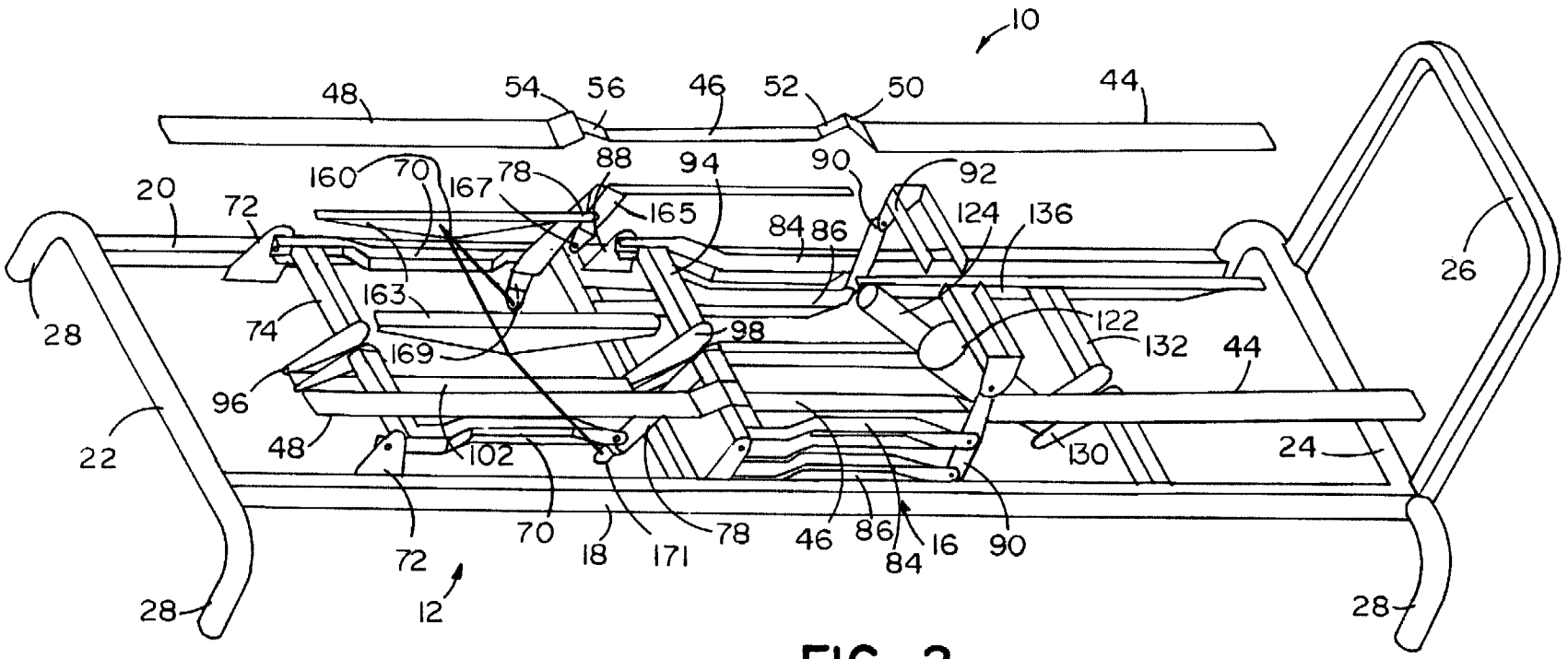
FIG. 2 is a fragmentary, perspective view of portions of the bed of FIG. 1.

An adjustable bed in accordance with the present invention is illustrated in FIGS. 1 and 2 and generally designated by the numeral 10. Bed 10 includes a base frame 12, a mattress frame 14 and a linkage or mounting arrangement generally designated 16. In the form illustrated, base frame 12 includes side rails 18, 20, transverse ends 22, 24 and a tubular headboard 26. Ends 22, 24 define legs 28. Mattress frame 14 includes a head or back section 32, an intermediate or seat section 34 and a foot or leg section 36. Sections 34 and 36 define a lower section of the frame. Each section is defined by a plurality of transverse wires 38 and a plurality of longitudinally extending wires 40. The sections have a grid work configuration. Head section 32 includes a pair of transversely spaced, generally rectangular shaped wire loops 44. Intermediate section 34 includes elongated straps 46. Leg section 36 includes a pair of transversely spaced, elongated wire loops 48. Ends 50 of loops 44 are hingedly connected to ends 52 of straps 46. Ends 54 of loops 48 are hingedly connected to ends 56 of straps 46. As a result, head section 32 is hingedly connected to intermediate section 34 so that it may articulate about the hinge points at ends 50, 52. The lower section of the mattress frame, including intermediate section 34 and leg section 36, are also hingedly interconnected at ends 54, 56.

Figure 3:
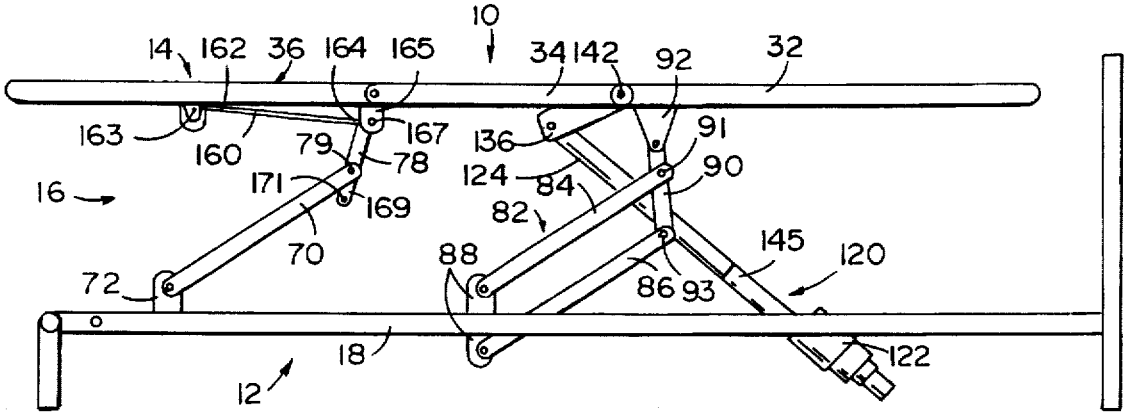
FIG. 3 is a side, elevational view of a bed in accordance with the present invention showing the mattress frame in the high position.

As seen in FIG. 2 and as schematically illustrated in FIG. 3, linkage arrangement 16 includes links 70 which are pivoted to base frame 18 at pivot brackets 72. A cross member 74 extends between links 70 adjacent the pivot bracket 72. Upper seat links 78 are pivoted to links 70 adjacent their lower ends at pivot points 79 and to mattress frame 14 at the pivotal interconnection between sections 34 and 36.

A four bar or parallelogram linkage, generally designated 82, is also included. Linkage 82 has links 84, 86, which are pivoted to a bracket link 88 on base frame 12 and to a link 90. Link 84 pivots to link 90 at pivot point 91, and link 86 pivots to link 90 at pivot point 93. Link 90 extends beyond upper link 84 and is pivoted to a bracket 92 which is fixed to head section 32. A cross member 94 (FIG. 2) extends between links 84 adjacent bracket 88. A strut 96 is fixed to cross member 74 and a strut 98 is fixed to cross member 94. A control link 102 extends between struts 96, 98. As a result, pivotal movement of link 84 about its pivot point with bracket 88 translates into pivotal movement of link 70 about its bracket 72. The linkage arrangement, therefore, interconnects mattress frame 14 with base frame 12 so that it may be moved between a high position illustrated in FIG. 3 and a low position illustrated in FIG. 4.

Figure 5:
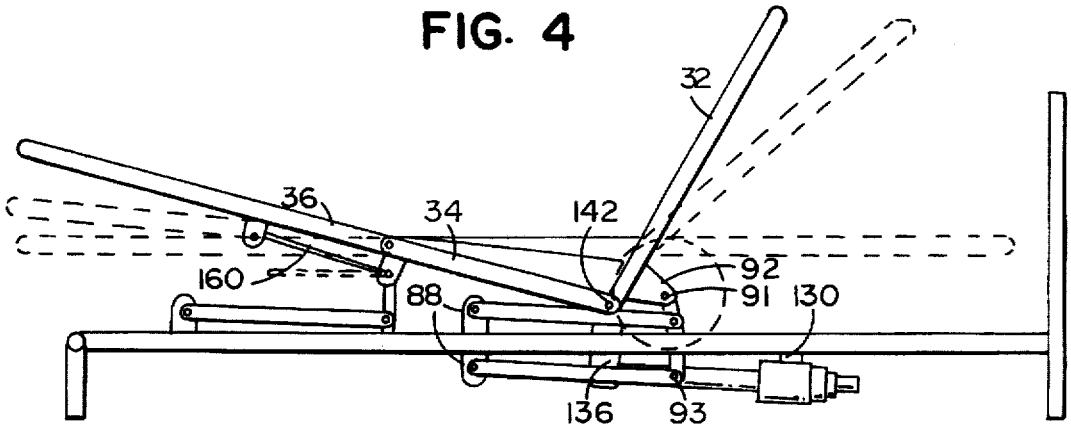
FIG. 5 is a side, elevational view showing articulation of the back section with respect to a lower section.

In accordance with the present invention, a single actuator or drive means 120 is provided for raising and lowering the mattress frame. Actuator 120 includes an electric motor 122 and an extendable and retractable member 124. As shown in FIGS. 2 and 5, one end of the actuator is pivoted to a strut 130 which is fixed to a cross piece 132. Piece 132 extends between base frame side rails 18, 20. Extendable member 124 is pivoted to a crank arm 136. Crank 136 is fixed to head or back section 32 adjacent a pivot or hinge point 142 between back section 32 and intermediate section 34. Crank arm 136 engages the intermediate section undersurface, which forms a stop, so that clockwise movement of section 32 about pivot point 142 is limited. Section 32 can be moved clockwise only to a flat or horizontal configuration with section 32 in the same plane as section 34. In a presently existing embodiment, actuator 120 is a linear actuator of the type marketed by Fasco under the model designation VW76. Electric motor 122 rotates a lead screw 145 which threadably engages extendable and retractable member 124.

Figure 6:
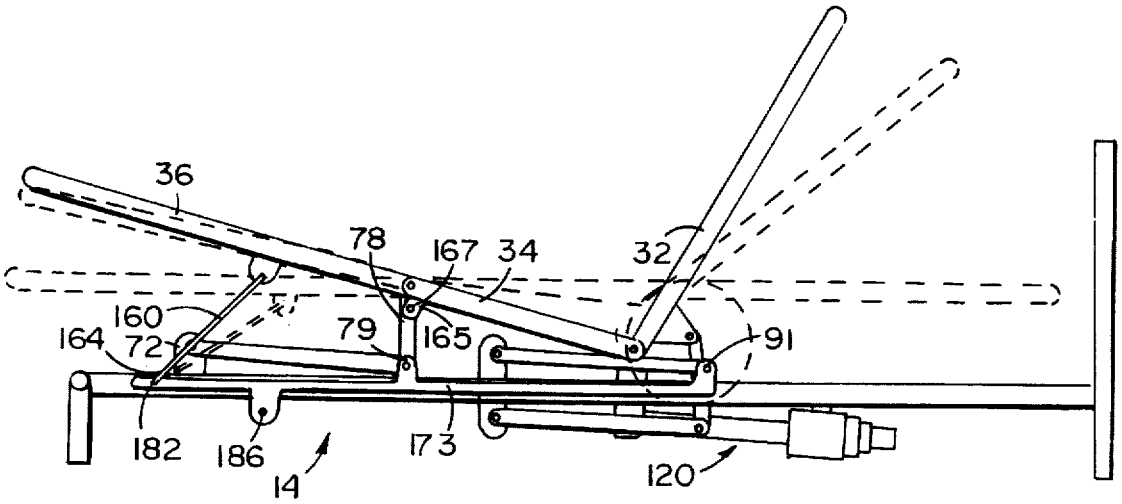
FIGS. 6, 7 and 8 are side, elevational views illustrating different positions of the leg section of the mattress frame with the frame in the low position.
Figure 7:
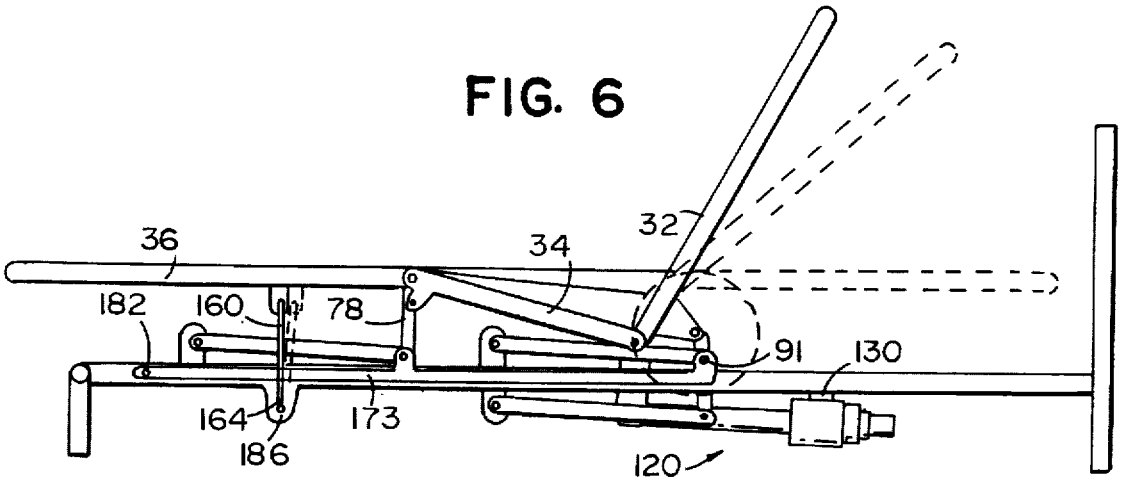

A leg pivot link 160 includes an upper end 162 which is pivoted to leg section 36 at brackets 163. A lower end 164 is attachable to different portions of the bed. In the form shown in FIGS. 2 and 3, intermediate section 34 includes a fixed depending tab 165 defining an aperture 167 for receipt of end 164 of link 160. Seat link 78 defines an extension 169 having an aperture or pivot point 171. As shown in FIGS. 6 and 7, another leg link 173 may also be included. Link 173 is pivotally connected to links 70, 78 at pivot point 79 and to links 84, 90 at pivot point 91. Leg link 173 defines apertures or pivot points 182, 186. Link 160 permits adjustment of the articulation of the leg section 36 with respect to the seat section 34.

OPERATION

Figure 4:
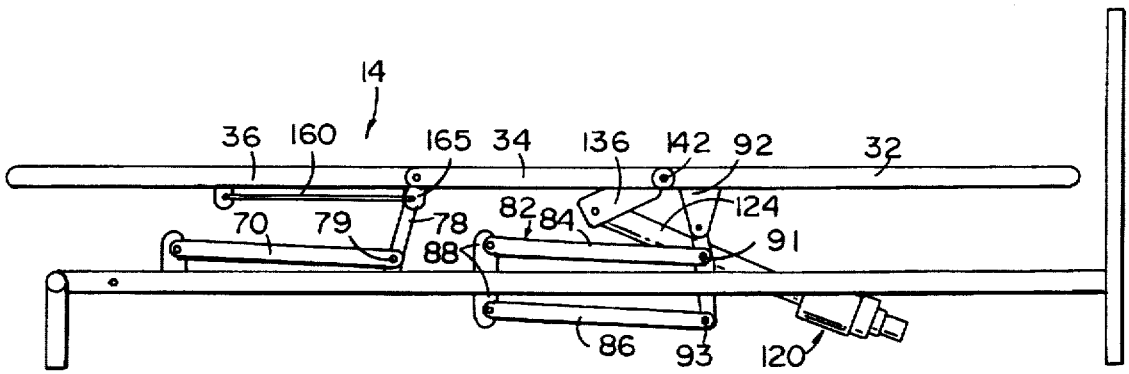
FIG. 4 is a side, elevational view showing the mattress frame in the low position.

When actuator 120 is at its fully extended position, as shown in FIG. 3, mattress frame 14 is flat or horizontal with sections 32, 34 and 36 all lying in a common plane. Mattress section 14 is at its high position with respect to base frame 12. Movement of mattress frame 14 to this position with respect to the base frame 12 is controlled by the links 70, 78, 82, 90 and 92. Crank arm 136 is in engagement with section 34 of the mattress frame. Actuator 120 retracts member 124 to a low position as shown in FIG. 4. Sections 32, 34 and 36 remain in the common plane. Link 70 and parallelogram linkage 82 have bee lowered to their lowermost positions. Further movement or retraction of member 124 causes back section 32 to pivot about point 142 to various raised or articulated positions FIG. 5). When the actuator is at its fully retracted position, the back or head section will be at its full upright or seated position, illustrated in solid lines in FIG. 5. Seat section 34 drops below horizontal and leg section 36 remains in the same plane therewith.

When actuator 120 is reversed and member 124 is moved towards its outer limits, section 32 will articulate back to the horizontal position and arm 136 will abut the stops defined by section 34. Continued extension of actuator 120 shifts mattress frame 14 from the low position, shown in FIG. 4, to the high position, shown in FIG. 3.

A single actuator, therefore, provides high and low positioning of the mattress frame for ease of patient care. Articulation of the back section with respect to the lower section thereof occurs only when the mattress frame is in its low position. The adjustable bed in accordance with the present invention, therefore, meets the majority of operation requirements of a typical articulating bed.

Leg section articulation, that is angled positioning of section 36 with respect to section 34, is achieved through placement of the leg pivot link 160. When link 160 is attached to seat tab 165 at aperture 167, it extends substantially parallel to leg section 36. Section 36 will remain in the same plane with seat section 34 (FIGS. 3, 4 and 5). Pivot link 160 is in effect locked with respect to the seat and the lower section.

As shown in FIG. 6, the end 164 of pivot link 160 may be moved to pivot point 182 on link 187 and which is rearwardly of bracket 72. When in this position, the leg section 36 will be elevated with respect to seat section 34 during back articulation.

As shown in FIG. 7, end 164 of leg link 160 may be positioned so that it is within aperture 186 of link 173. When so positioned, link 160 is substantially parallel to seat link 78. When in such a position, minimal leg section articulation is achieved. Leg section 36 remains in a substantially horizontal plane, while the back section 32 and seat section 34 articulate with respect to each other.

Figure 8:
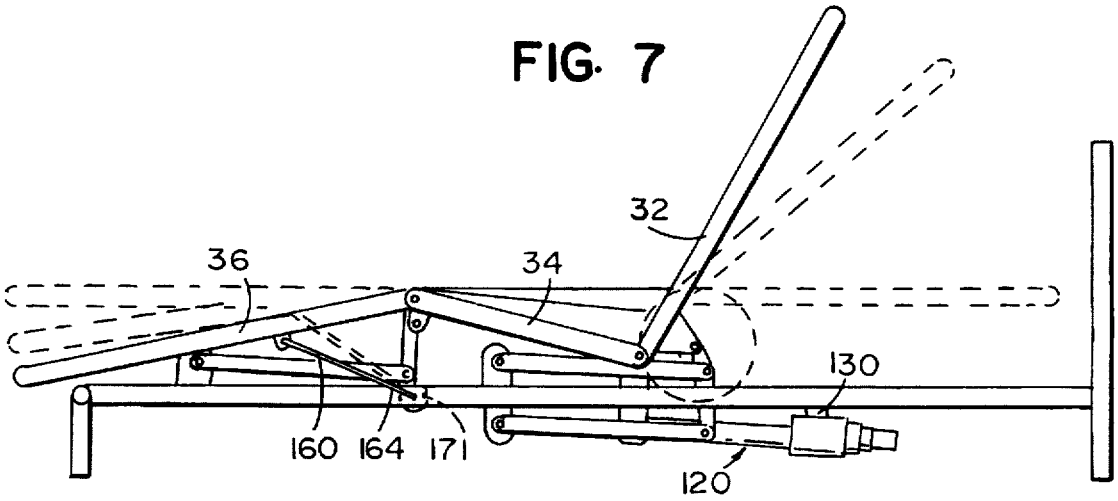

As shown in FIG. 8, leg pivot link 160 may be pivoted forwardly so that the lower end 164 thereof engages pivot point 171 which is defined by seat link 78. When end 164 is thus moved towards head section 32, leg section 36 will drop with respect to seat section 34 providing a knee break for the patient. When the bed is to be moved so that the mattress frame is raised to the high position, leg link 160 is returned to its position on seat section tab 165 parallel to leg section 36.

The use of the pivotally connected leg link, therefore, between the foot section of the bed and different locations on the bed yield different characteristics of leg articulation. The specific elevation of the leg section and/or bending at the knee required by different patients for comfort and rehabilitation is readily achieved.

A single linear actuator operates in the lift mode in accordance with the present invention at one limit to raise the mattress frame to a high position for proper patient care and also for lowering the mattress frame to its lowest most position for normal patient use. The same actuator also achieves back articulation only when the bed is in the lowest position. Multiple actuators, cranks and motors are eliminated. A bed in accordance with the present invention is of a significantly reduced complexity from prior motorized beds while satisfying the vast majority of the operating modes or requirements for an adjustable bed in a healthcare environment. The adjustable bed in accordance with the present invention is relatively easily manufactured at reduced costs from that heretofore experienced.

In view of the above description, those of ordinary skill in the art may envision various modifications which would not depart from the inventive concepts disclosed herein. For example, if leg articulation is not needed, the mattress frame could include only two articulating sections, namely a head section and a lower section. It is expressly intended, therefore, that the above should be considered as only that of the preferred embodiment. The true spirit an scope of the present invention may be determined by reference to the appended claims.

The embodiments of the invention in which an exclusive property or privilege is claimed are defined as follows:

1. An adjustable bed, comprising:

a base frame;

a mattress frame including a head section and a lower section pivoted to said head section;

mounting means operatively connected to said base frame and said mattress frame for permitting said mattress frame to be moved between a high position and a low position relative to the base frame with the head section and lower section of the mattress frame lying in a generally common plane and for permitting said head section to pivot upwardly with respect to said lower section to define a sated position only when said mattress frame is in the low position; and a single actuator pivotally connected to said base frame and having an extendable and retractable member directly connected to said head section of said mattress frame for lowering said mattress frame from the high position to the low position with said sections in a horizontal orientation and for pivoting said head section upwardly towards the seated position only when the mattress frame is in said low position.

2. An adjustable bed as defined by claim 1 wherein said mounting means comprises:

a first pair of pivotally interconnected links, one of said links being pivoted to said lower section and the other of said links being pivoted to said base frame.

3. An adjustable bed as defined by claim 2 wherein said mounting means further comprises:

a second pair of pivotally interconnected links connected between said head section and said base frame.

4. An adjustable bed as defined by claim 3 wherein said actuator comprises:

a crank arm fixed to said head section.

5. An adjustable bed as defined by claim 4 wherein said actuator extendable and retractable member is connected to said crank arm.

6. An adjustable bed as defined by claim 1 wherein said lower section of said mattress frame comprises:

a leg section; and a seat section pivoted to said leg section and said head section.

7. An adjustable bed as defined by claim 6 wherein said mounting means comprises a plurality of links connected between said base frame and said mattress frame, said links permitting said mattress frame to be moved between said low and high positions with said sections in a common plane.

8. An adjustable bed as defined by claim 6 further including a leg section pivot link having an end pivoted to said leg section and another end selectively connectable to said mounting means and said mattress frame to fix the leg section with respect to said seat section and permit leg section articulation with respect to said seat section.

9. An adjustable bed as defined by claim 8 wherein said mounting means comprises a plurality of links connected between said base frame and said mattress frame, said links permitting said mattress frame to be moved between said low and high positions with said sections in a common plane.

10. An adjustable bed as defined by claim 9 wherein said actuator comprises:

a crank arm fixed to said head section.

11. An adjustable bed as defined by claim 10 wherein said actuator further comprises:

a drive including an extendable and retractable member, said member being connected to said crank arm.

12. A high/low mechanism for an articulating bed of the type including a base and a mattress support having a back section pivoted to a leg section, said mechanism comprising:

an arm attachable to the back section;

linkage means adapted to be connected to the base and the mattress support and permitting the support to be moved between high and low positions relative to the base with the back and leg sections lying in a common plane;

an actuator bracket attachable to the base; and a linear actuator pivoted to said actuator bracket and having an extendable and retractable element, said element connected to said arm and wherein said arm and said linkage means are positionable and dimensioned so that when the element is in a fully retracted position the back section is angled to a seating position relative to said leg section and as the element extends towards an outer limit the back section is lowered to a flat position relative to said leg section and the mattress support is then raised to the high position with said sections flat.

13. A high/low mechanism as defined by claim 12 wherein said linkage means comprises:

a first pair of pivotally interconnected links, one of said links being pivotable to the leg section of the mattress support and the other of said links being pivotable to the base of the bed.

14. A high/low mechanism as defined by claim 13 wherein said mounting means further comprises:

a second pair of pivotally interconnected links connectable between the back section of the mattress frame and the base of the bed.

15. A high/low mechanism as defined by claim 14 wherein said linkage means further includes a control link extending between links of said first and second pairs of links.

16. A high/low mechanism as defined by claim 15 wherein said linear actuator includes an electric motor and a lead screw.

17. A high/low mechanism as defined by claim 12 further including:

a leg section pivot link selectively connectable to said linkage means; and a leg section bracket pivotally supporting said leg section pivot link, said leg section bracket being attachable to the mattress support.

*18. An adjustable bed, comprising:*

*a base frame;*

*a mattress frame including a first section and a second section pivoted to said first section;*

*mounting means operatively connected to said base frame and said mattress frame for permitting said mattress frame to be moved between a high position and a low position relative to the base frame with the first section and second section of the mattress frame lying in a generally common plane and for permitting said first section to articulate with respect to said second section only when said mattress frame is in the low position; and*

*a single actuator pivotally connected to said base frame and having an extendable and retractable member directly connected to said first section of said mattress frame for lowering said mattress frame from the high position to the low position with said sections in a horizontal orientation and for articulating said first section with respect to said second section only when the mattress frame is in said low position.*

*19. An adjustable bed as defined by claim 18 wherein said mounting means comprises:*

*a first pair of pivotally interconnected links, one of said links being pivoted to said second section and the other of said links being pivoted to said base frame.*

*20. An adjustable bed as defined by claim 19 wherein said mounting means further comprises:*

*a second pair of pivotally interconnected links connected between said first section and said base frame.*

*21. An adjustable bed as defined by claim 20 wherein said actuator comprises:*

*a crank arm fixed to said first section, said actuator extendable and retractable member being connected to said crank arm.*

*22. A high/low mechanism for an articulating bed of the type including a base and a mattress support having a first section pivoted to a second section, said mechanism comprising:*

*an arm attachable to one of said sections;*

*linkage means adapted to be connected to the base and the mattress support and permitting the support to be moved between high and low positions relative to the base with the first and second sections lying in a common plane;*

*an actuator bracket attachable to the base; and*

*a linear actuator pivoted to said actuator bracket and having an extendable and retractable element, said element connected to said arm and wherein said arm and said linkage means are positionable and dimensioned so that when the element is in a fully retracted position the first section is angled relative to said second section and as the element extends towards an outer limit the first section is lowered to a flat position relative to said second section and the mattress support is then raised to the high position with said sections flat.*

*23. A high/low mechanism as defined by claim 22 wherein said linkage means comprises:*

*a first pair of pivotally interconnected links, one of said links being pivotable to the first section of the mattress support and the other of said links being pivotable to the base of the bed;*

*a second pair of pivotally interconnected links connectable between the second section of the mattress frame and the base of the bed; and*

*a control link extending between links of said first and second pairs of links.*

*24. A high/low mechanism as defined by claim 23 wherein said linear actuator includes an electric motor and a lead screw.*

*25. A high/low mechanism as defined by claim 23 further including:*

*a leg section pivot link selectively connectable to said linkage means; and*

*a leg section bracket pivotally supporting said leg section pivot link, said leg section bracket being attachable to the mattress support.*

* * * * *